United States Patent
Zhang et al.

(10) Patent No.: US 9,399,480 B2
(45) Date of Patent: Jul. 26, 2016

(54) HEATING AND COOLING DEVICE FOR HANDLES, ESPECIALLY OF STEERING MECHANISMS

(71) Applicant: W.E.T. Automotive Systems AG, Odelzhausen (DE)

(72) Inventors: Jonathan (Yu) Zhang, Tianjin (CN); Fred (Fufei) Zhang, Langfang (CN); Melinda (Meijing) Hu, Langfang (CN)

(73) Assignee: GENTHERM GMBH, Odelzhausen (DE)

( * ) Notice: Subject to any disclaimer, the term of this patent is extended or adjusted under 35 U.S.C. 154(b) by 268 days.

(21) Appl. No.: 14/028,720

(22) Filed: Sep. 17, 2013

(65) Prior Publication Data

US 2014/0090513 A1    Apr. 3, 2014

(30) Foreign Application Priority Data

Sep. 28, 2012 (DE) .......................... 10 2012 019 065
Oct. 9, 2012 (DE) .......................... 10 2012 019 765

(51) Int. Cl.
*B62D 1/06* (2006.01)
*B60H 1/00* (2006.01)

(52) U.S. Cl.
CPC ............ *B62D 1/065* (2013.01); *B60H 1/00292* (2013.01); *Y10T 74/20834* (2015.01)

(58) Field of Classification Search
CPC ..................... Y10T 74/2087; Y10T 74/20876; Y10T 74/20834; Y10T 29/49488; B62D 1/065; B62D 1/06; B62D 1/04; B60H 1/00292
See application file for complete search history.

(56) References Cited

U.S. PATENT DOCUMENTS

| | | | |
|---|---|---|---|
| 1,587,586 A * | 6/1926 | Hollis et al. | 237/12.3 R |
| 1,615,635 A | 1/1927 | Kuno | |
| 1,617,226 A * | 2/1927 | White et al. | 237/12.3 R |
| 2,163,450 A | 6/1939 | Preble | |
| 2,251,370 A * | 8/1941 | Motzer | 237/12.3 R |
| 2,835,777 A | 5/1958 | Gates et al. | |
| 3,165,620 A | 1/1965 | Miller | |
| 3,298,750 A | 1/1967 | Kerner et al. | |
| 3,489,031 A * | 1/1970 | Meier | B62D 1/06 273/DIG. 5 |
| 3,876,844 A | 4/1975 | Scherenberg | |
| 4,547,655 A | 10/1985 | Kurata et al. | |
| 4,549,069 A | 10/1985 | Oge | |
| 4,640,340 A | 2/1987 | Noda et al. | |
| 4,993,281 A | 2/1991 | Miller | |
| 5,138,851 A * | 8/1992 | Mardikian | B60H 1/00271 62/244 |
| 5,605,643 A | 2/1997 | Reece | |
| 5,847,360 A | 12/1998 | Lorenzen et al. | |
| 5,850,741 A | 12/1998 | Feher | |

(Continued)

FOREIGN PATENT DOCUMENTS

| | | |
|---|---|---|
| DE | 7149043 | 4/1972 |
| DE | 3713450 A1 * | 11/1988 |

(Continued)

OTHER PUBLICATIONS

German Office Action, Application No. 10 2012 019 765.9, dated May 23, 2013.

*Primary Examiner* — Daniel Yabut
(74) *Attorney, Agent, or Firm* — The Dobrusin Law Firm, P.C.

(57) ABSTRACT

The present invention relates to a device for influencing at least one climatic parameter and more specifically the device is provided to influence a zone meant for handling.

16 Claims, 3 Drawing Sheets

(56) References Cited

U.S. PATENT DOCUMENTS

| | | |
|---|---|---|
| 5,948,347 A | 9/1999 | Van Jaarsveld et al. |
| 6,007,420 A | 12/1999 | Harm et al. |
| 6,093,908 A | 7/2000 | Haag |
| 6,172,342 B1 | 1/2001 | Khafagy et al. |
| 6,326,593 B1 | 12/2001 | Bonn et al. |
| 6,392,195 B1 | 5/2002 | Zhao et al. |
| 6,414,270 B1 | 7/2002 | Sugiyama et al. |
| 6,441,344 B1 | 8/2002 | Bonn et al. |
| 6,481,312 B1 | 11/2002 | Wissel |
| 6,509,552 B1 | 1/2003 | Roske |
| 6,512,202 B2 | 1/2003 | Haag et al. |
| 6,533,184 B1 | 3/2003 | Kim |
| 6,668,682 B1 | 12/2003 | Emeneth et al. |
| 6,668,683 B2 | 12/2003 | Fleckenstein |
| 6,727,467 B1 | 4/2004 | Hadzizukic et al. |
| 6,762,394 B2 | 7/2004 | Hobby |
| 6,838,647 B2 | 1/2005 | Nagele |
| 6,862,807 B2 | 3/2005 | Wissel |
| 7,019,261 B2 | 3/2006 | Worrell et al. |
| 7,145,102 B2 | 12/2006 | Hadzizukic et al. |
| D559,158 S | 1/2008 | Garcia |
| 7,378,615 B1 | 5/2008 | King |
| 7,908,941 B2 | 3/2011 | Menaldo et al. |
| 8,015,835 B2 | 9/2011 | Lee et al. |
| 2002/0166407 A1 | 11/2002 | Germuth-Loffler |
| 2004/0168540 A1 | 9/2004 | Weiss |
| 2006/0033628 A1 | 2/2006 | Duval |
| 2006/0121843 A1 | 6/2006 | Koval |
| 2007/0101728 A1 | 5/2007 | Ruetz |
| 2008/0210048 A1 | 9/2008 | Yoneyama et al. |
| 2009/0114368 A1 | 5/2009 | Niwa et al. |
| 2010/0288073 A1 | 11/2010 | Shin et al. |
| 2013/0180354 A1 | 7/2013 | Maranville et al. |

FOREIGN PATENT DOCUMENTS

| | | | |
|---|---|---|---|
| DE | 9111356 | 1/1992 | |
| DE | 29515265 | 2/1996 | |
| DE | 19951224 | 5/2001 | |
| DE | 19953467 A1 | 5/2001 | |
| DE | 202004005181 | 10/2004 | |
| DE | 102004006639 | 9/2005 | |
| DE | 102004027008 | 12/2005 | |
| DE | 102005053182 | 5/2007 | |
| DE | 60317179 | 8/2008 | |
| DE | 202012009655 U1 | 1/2014 | |
| EP | 0992416 A2 | 4/2000 | |
| EP | 2065234 A1 | 6/2009 | |
| GB | 779918 A * | 7/1957 | ............ B62D 1/065 |
| JP | 62-128878 | 6/1987 | |
| JP | H01178078 A | 7/1989 | |
| JP | 10-230857 | 9/1998 | |
| JP | 2006/176037 | 7/2006 | |
| WO | 03/047942 | 6/2003 | |

\* cited by examiner

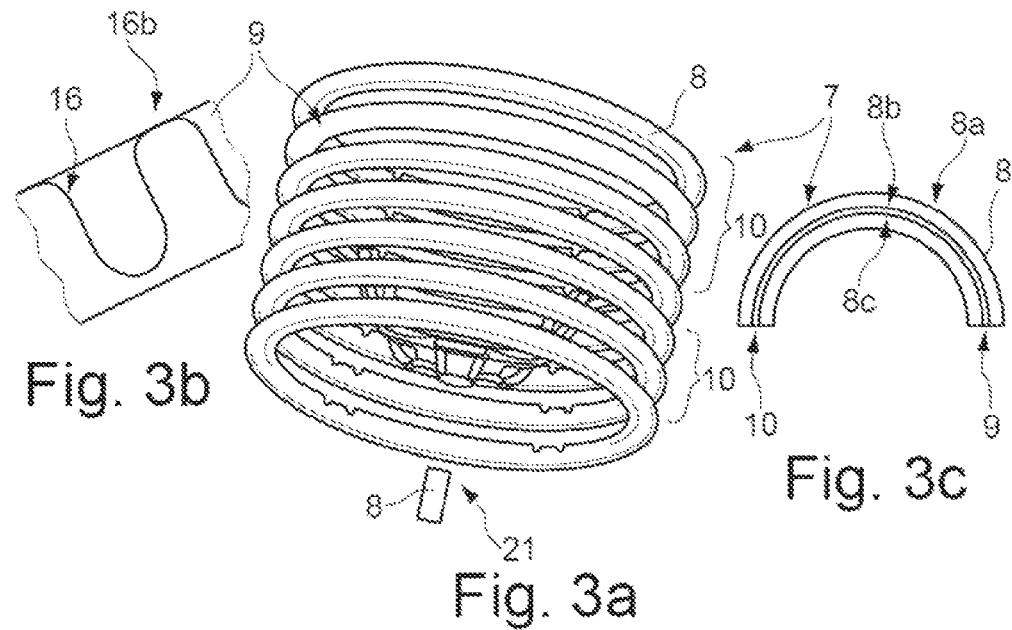
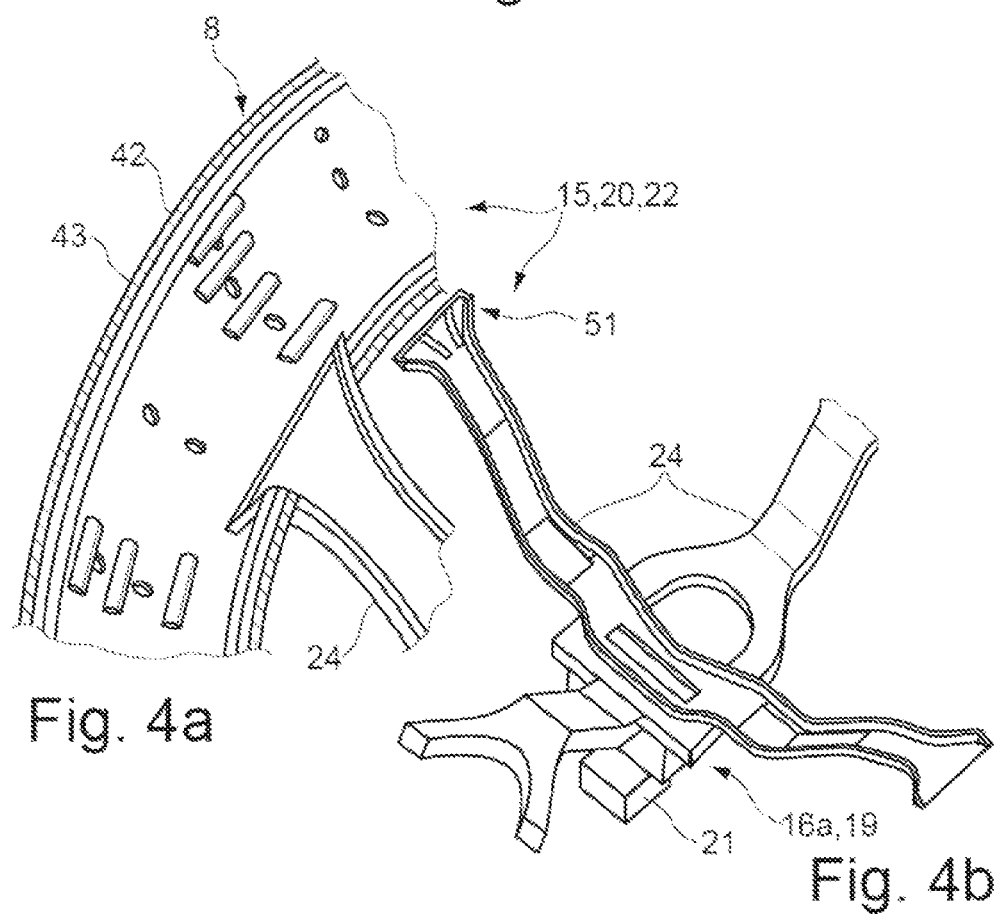

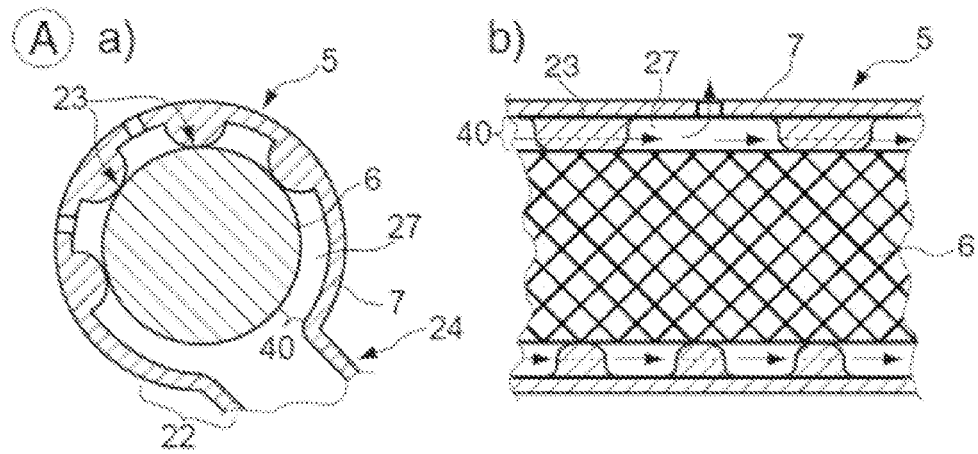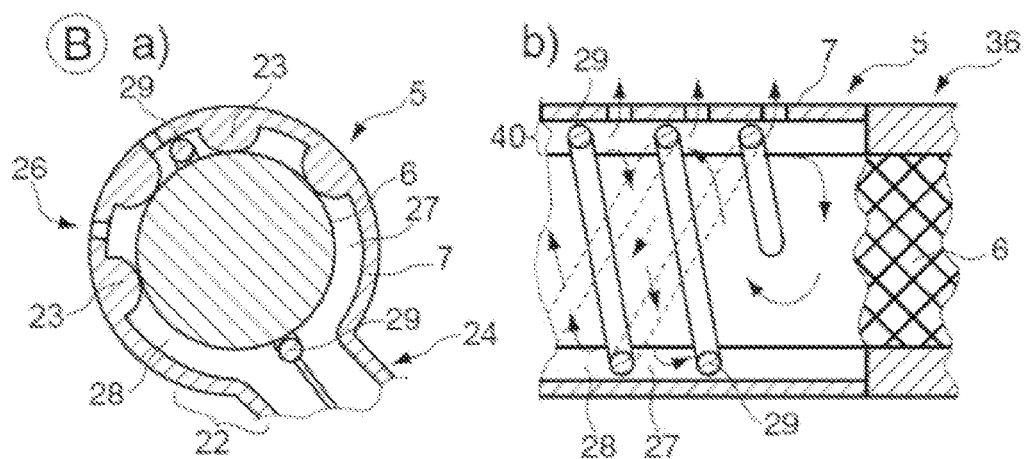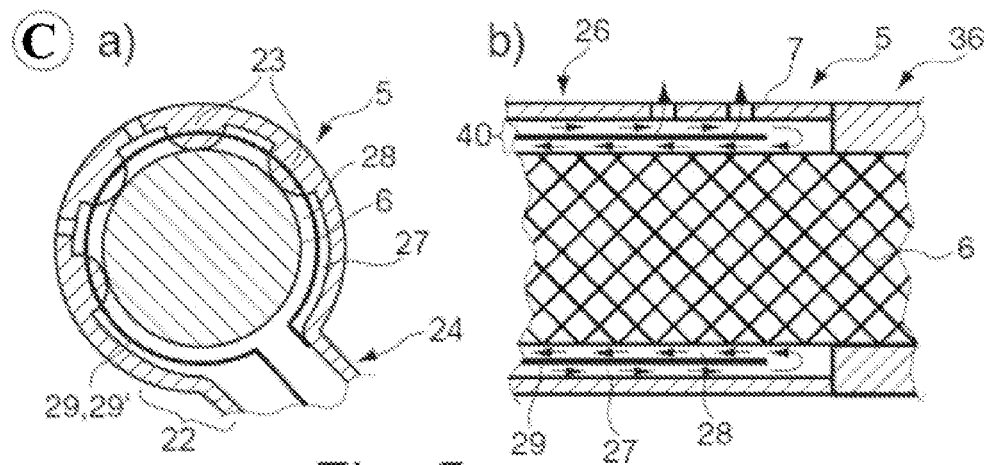
Fig. 5

HEATING AND COOLING DEVICE FOR HANDLES, ESPECIALLY OF STEERING MECHANISMS

BACKGROUND OF THE INVENTION

An object according to the present invention is a heating and cooling device for handles and steering mechanisms for influencing at least one climatic parameter. It can, for example, be used in the heating, cooling or ventilation of handles of vehicle doors, steering wheels or control sticks.

PRIOR ART

Steering wheels with windings made of textile heating elements are known. The disadvantage with this is great expense for crease-free installation. Hollow steering wheels are also known. What hinders them is that they are not authorized for such steering wheels used in modem vehicles. Therefore, it is desirable to further develop the prior art, especially as regards simpler installation and greater stability.

SUBJECT OF THE INVENTION

With this as background, a technical concept is a device for influencing at least one climatic parameter, characterized in that the device is provided for influencing a zone meant for handling.

The present teachings herein provide for a handle, vehicle, or steering mechanism, equipped with at least one device according to any of the teachings herein.

A steering mechanism comprising: (i) a pivot pole that is an axis of the steering mechanism; (ii) a handle; and (iii) at least one spoke that connects the pivot pole to the handle; wherein the steering mechanism includes a device for influencing at least one climatic parameter the device for influencing at least one climatic parameter being located in a central portion of the steering mechanism.

Additional advantageous embodiments can be gleaned from the additional claims and the specification that follows.

The invention relates to a device for influencing at least one climatic parameter. If the device for influencing a zone to be gripped is provided, then surfaces touched by the user, especially handles, can be suitably temperature-controlled, especially steering wheels, door handles, steps, operating handles of machines, etc.

If the device exhibits or is a heating, ventilation or cooling device, then, depending on the requirement, the temperature, the humidity or the air composition at the handle can be adjusted.

If the device is provided to heat or cool a control device, then overheating of a steering wheel in the sun or excess cooling of it in the winter can be avoided.

In addition, the invention relates to a handle, a vehicle or a steering device. If these are equipped with a device described above, this improves its capacity for use under climatically unfavorable conditions.

FIGURES

In what follows, the particulars of the invention are explained. These embodiments should make the invention understandable. However, they are of only an exemplary nature. Naturally, within the framework of the invention defined by the independent claims, certain individual or multiple features described can be left out, altered or supplemented. Also, the features of differing embodiment forms naturally could be combined with each other. What is decisive is that the concept of the invention is implemented in its essence. If one feature is to be implemented at least partially, then it includes this feature being implemented fully also, or being essentially implemented in full. "Essentially" especially means that the implementation permits the desired utility to be attained to a perceptible degree. This can especially mean that a corresponding feature is attained at least by 50%, 90%, 95% or 99%. If a minimum amount is indicated, then naturally more than this minimum amount can also be used. If the number of a component is indicated by at least one, then this especially includes embodiment forms also with two, three or some other plurality of components. What is described for one object, can also be applied for the preponderant part or the totality of all other objects identical in nature. If nothing otherwise is indicated, intervals include their end points. In what follows, reference is made to:

FIG. 3a) is a perspective exploded view of the steering device of FIG. 1 from the side, from slightly below.

FIG. 3b) illustrates a shell-shaped heating element with carrier and heating conductor, integrated into the steering device of FIG. 3.

FIG. 3c) illustrates an upper mantle shell of the steering device of FIG. 3a) as a module of two rigid half-shells with a heating element placed between, as per FIG. 3b).

FIG. 4a) is a perspective detail view of a lower mantle shell and an attachment point of a feed device.

Figure 2:
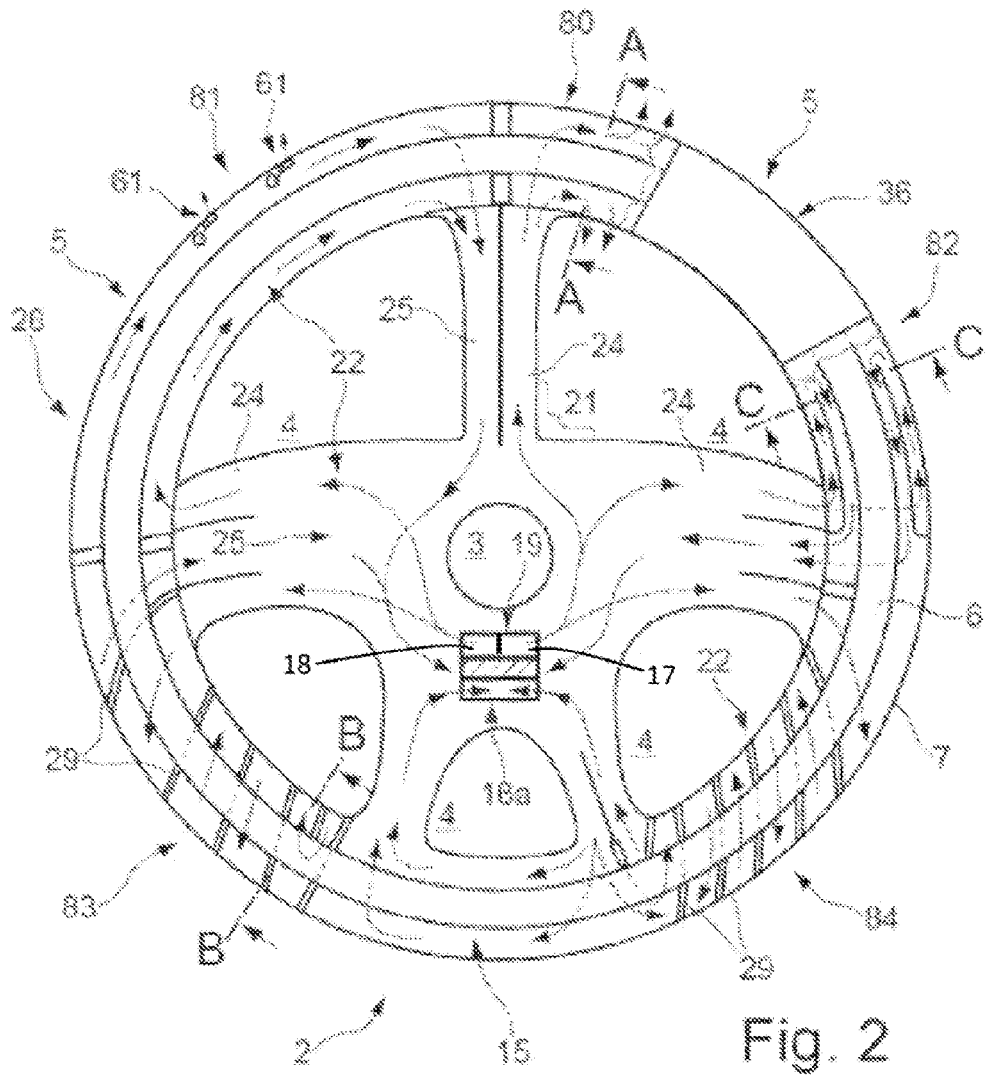
FIG. 2 illustrates a steering device from FIG. 1, partially in a top-down view (monocoque shell 36), partially in an outline (the rest).

FIG. 4b) is a simplified depiction of a feed device and a return device for a steering device from FIG. 3; to enhance visibility, the individual connection lines of the steering device of FIG. 2 are not shown.

FIG. 5A a) is a cross section through the handle of the steering device in the area A-A with flow passing through the cross section in a single direction.

FIG. 5A b) illustrates a longitudinal section through the handle of the steering device in the area A-A FIG. 5B a) is a cross section through the handle of the steering device in the area B-B with screw-shaped flow passing through the cross section in two opposite directions.

FIG. 5B b) is a cross section through the handle of the steering device in the area B-B with reversal of flow by one solid handle section 36.

FIG. 5C a) is a cross section through the handle of the steering device in the area C-C with a hollow-cylinder-shaped flow passing through the cross section in two opposing directions.

FIG. 5C b) is a longitudinal section through the handle of the steering device in the area C-C with C-C with two opposing air flows at two differing height levels relative to the handle axis, which are reversed by a solid handle section 36.

SPECIFICATION

Figure 1:
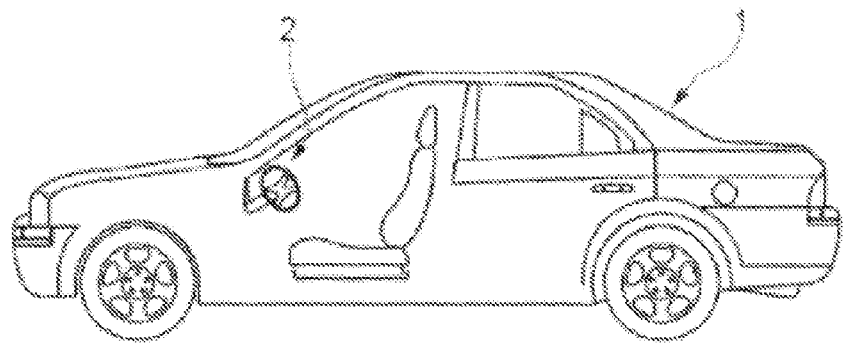
FIG. 1 illustrates a vehicle 1 with a heated and cooled steering device in a partial longitudinal section.

The invention relates especially to a vehicle 1 as per FIG. 1. A vehicle means a device for transport of persons and/or freight, such as vehicles on land, water, railways and in the air, especially aircraft, ships and automotive vehicles.

The invention additionally relates to a steering mechanism 2, such as steering wheels of motor vehicles as per FIG. 2, control sticks or aircraft or drag links of motorcycles.

Preferably the at least one control mechanism has a pivot pole 3. Pivot pole means the reference point or the reference axis about which a steering mechanism is moved to generate a steering signal. Examples are a so-called front end tor a motorcycle steering bar or the steering wheel cup with a steering wheel, a centering point with a multidimensional-operation control stick or some other reference point with a nonrotary-operating steering system such as sliding rheostats.

Preferably the at least one steering mechanism has at least one spoke 4. Spoke means a device for connecting the handle 5 with the pivot pole 3 for transferring mechanical forces and especially guiding motions. Examples are spokes of a steering wheel, steering bars of a motorcycle guide mechanism or the center piece of a control stick. They are provided in a sufficient number for stable suspension of the handle or handles, for example one spoke for a control stick, two for steering rods and two or more for steering wheels.

Preferably the at least one steering mechanism has at least one handle 5. Handle means a device for grasping and applying adjustment forces, especially for manual adjustment of steering devices, of doors, or for operation of motors. Examples are steering handles on motorcycles or steering wheel rings on steering wheels. Especially suited for this are knobs, rods or annular or arc-shaped round profiles made for example of wood, plastic or metal.

Preferably the at least one handle has at least one handle framework 6 for sufficient stability and stiffness of the steering mechanism. Handle framework means a support structure to admit and transmit mechanical loads acting on the steering mechanism, such as a steering wheel core or a control stick shaft. To attain a high level of form stiffness with low weight, tubes or U-profiles are suitable which are have at least partially hollow interiors. Stable materials for this are steel, aluminum or carbon fiber materials.

Preferably the at least one handle has at least one jacket 7 according to FIGS. 3 to 5. A jacket means a device which surrounds the handle framework, or, if such is lacking, assumes its function as an exoskeletal structure. This provides a safe and comfortably grippable surface and a screening of functional elements in the handle from harmful outside influences such as sweat. Conversely, the comfort of the user is not hampered by installed components. For simple installation consisting of few parts, and a protective mantle closed roundabout, at low cost and high utilization comfort, hollow cylinders, hollow rings and linear or curved U profiles are preferred. The length of the jacket preferably matches the length of the handle piece, thus for example the entire steering-wheel circumference. Usually the outer diameter of such a jacket. corresponds to the outer diameter of the handle. For good heating capacity, its inner diameter preferably allows a gap 40 through which air can pass between the handle framework and the jacket. This gap between the handle framework and the jacket preferably is at least 2 mm, and better 5 mm.

Preferably the at least one jacket has at least one carrying shell 8. Carrying shell means a device for supporting and reinforcing a jacket, for example through a U profile curved about two axes. Their number ensures a sufficient form stiffness, or one that is mutually reinforcing. For example, conceivable are a first load-admitting outer shell 8a, with a second shell 8b of a heat carrier bearing a heat conductor placed in it, and a third self-supporting shell 8c for an air-directing channel as per FIG. 3c). To protect sensitive parts in the interior of the carrier shell and a user from hard surfaces, a carrier shell is for example positioned on an outer side of a jacket, in its middle or on its inner side. It is favorable for a carrier shell to have an outer upholstery or covering. Injection-moldable polymers, fiber-reinforced composite material or hard or soft foams or the like are suitable for the carrier shell 8 as material, for simple assembly and safe usage.

Preferably the at least one jacket has at least one attendant layer 9. Attendant layer means a layer with an additional function, placed on a carrier shell. Examples are planar textile or foil heating elements or an aluminum layer lying above for improved heat distribution on the handle surface. An attendant layer can by itself form a carrier shell 8b. In favorable fashion, all attendant layers of the jacket are united with the carrier layer or layers into shell-like modules, to facilitate assembly. This permits a combination of functions in the jacket within or outside a carrier shell, without these functions being a mutual hindrance.

Preferably the at least one jacket has at least one partial shell 10 for simplified assembly without parts that have low flexural strength. Partial shell means a component or an assembly, which is designated for the formwork of a partial section of a handle. Preferably it is a self-supporting component, thus not having low flexural strength. For example, an upper and a lower, single- or multi-layer half shell made of U profiles is suitable, which is meant to admit the handle framework and in sections to surround it. A number of two or more per handle facilitates the assembly.

Preferably the at least one handle has an upholstery piece 42 made, for example, of foamed polyurethane.

Preferably the at least one handle has at least one covering 43 to provide decorative trim to a handle and to mechanically protect it. Covering means a single- or multiple-layer planar structure that is placed at least in sections on the surface of a handle, and/or at least partially covers it.

In addition, the invention also relates to a cooling device 15. Cooling device means an object that is suited to influence an area to be cooled, with regard to at least one climatic parameter, for example for heating, ventilation, moisturizing or removal of moisture, and/or cooling.

Preferably the at least one cooling device 15 has at least one temperature-control device 17. Temperature-control device means a device which serves for deliberate temperature control of a user or of an object to be heated, especially for raising, maintaining or lowering the temperature, such as heating, cooling or ventilating devices.

In addition, the invention relates to a heating device 16, which preferably comprises the temperature control device or a component part of it. A heating device means a device that provides thermal energy for specific heating of its surroundings, and emits conductively, convectively and/or through thermal radiation to its surroundings. Examples are devices with at least one electrical resistance heater, a heat pump, a radiator, or a heating spiral, with multiples of these components, also of differing types, also possibly being present. It is favorable if a planar heating element 16b is provided in a jacket for heating a handle surface and additionally a Peltier element 16a or a PTC heating module is provided in an air flow for heating the air.

Preferably the at least one heating device 16 has at least one filament rheostat 18 for direct or indirect heating of a handle. Filament rheostat means an ohmic resistance or some other electrical component which converts electrical into thermal energy when current passes through. Examples are a plurality of heating sections made of carbon fibers, PCT heating modules connected in an air flow, layers made of an electrically conducting plastic, metal foils such as those made of aluminum or individual large-area heating sections made of metallic strands as in FIG. 3b). For example, positions above, in or below a layer, a jacket, or a carrier shell are favorable for the best possible, direct heat transfer to the surface to be temperature-controlled. Preferably a filament rheostat is at least partially embedded in a carrier shell, especially during preferably plastic displacement of carrier material, so as to not to calk outwards.

It is understood that the temperature control device 17 and the filament rheostat 18 illustrated in Fig. 2 of the drawings are illustrated in the form of schematic graphical representations or drawing symbols (e.g., rectangular boxes). In other words, the location, size, and/or shape of the graphical representation of the temperature control device 17 and the filament rheostat 18 illustrated in FIG. 2 may not be representative of the actual location, size, and shape of these features.

Preferably the at least one temperature-control device exhibits at least one cooling device 19 for removal of excess thermal energy, especially through insolation. Cooling device means a device to lower the temperature of a surface to be cooled or an object to be cooled, such as Peltier elements, thermal conduction pipes or ventilation devices such as fans. A position at a distance from temperature-controlled zones promotes simple assembly and reduced structural space, for example in the direction of flow immediately behind a fan, especially close to, or in, a pivot pole of the steering mechanism. Fans with integrated Peltier modules are favorable for a modular combination of the fan and cooling device.

Preferably the at least one cooling device exhibits at least one ventilation device 20. Ventilation device means a device that can be used for deliberate alteration of the air composition or the air flows in a specific two-dimensional or three-dimensional area.

Preferably the at least one ventilation device exhibits at least one air supply device 21. Air supply device means a device for moving of air. Examples are fans, especially a radial fan as in FIG. 3a) and FIG. 4b) or an onboard air conditioner.

Preferably the at least one ventilation or air conditioning device exhibits at least one air guidance device 22. Air guidance device means a device which can guide air in at least one direction between a zone to be air-conditioned and an air feed device or along a zone to be ventilated.

Preferably the least one air guidance device and especially a handle distributor possess at least one spacer device 23. Spacer device means a device which keeps open an air guidance device or components thereof at least partially for an air flow even when mechanical loads are acting from without. Knob- or fin-shaped profiles of a deflecting vane or of a jacket are suitable.

Preferably the at least one air guidance device exhibits at least one feed device 24. Feed device means a device for feeding in or fresh or temperature-controlled air from an air feeding device in a handle distributor, for example through rectangular or round hollow profiles or along open U profiles whose open side is closed by a spoke, for example. The number of them is chosen so that it is possible to supply the handle uniformly at every position. For example, at least one of these, preferably two and more are preferably situated in specular or rotational symmetry relative to each other to the steering mechanism. The width of them permits optical coverage and for example corresponds roughly to the width of the spokes. The structural height of them maintains the gripping capacity, in that for example the cables are flattened in the sections 51 close to the handle. This can be compensated by an increased width. In cross section, the feed device 24 is for example rectangular or oval. It is preferred that their surface corresponds to the cross sectional surface of a handle distributor 26 impinging on it Its position allows for the steering wheel to be operable without disturbance, for example below and at least in essence along a spoke or below the steering-wheel plane. A shatter-resistant and robust component such as injection-moldable plastic, metal or wood is preferred as the material.

Preferably the at least one air guidance device exhibits at least one return-flow device 25. Return-flow device means a device to return air from a handle distributor into an air feed device, especially for diverting air having an undesired temperature out of the handle. As regards their number, dimensions, position and material, the same holds true as for the feed device. Rational coordination of the feed and return-flow device results in an arrangement in which the two a) exhibit attachments situated to be offset by 90 degrees, for example, to each other along the handle; b) form a forward- and rearward-line combined next to each other in a channel shaft; or c) one of the two devices is dispensed with, if air is to be transported without an internal reversal of direction only through air openings in a jacket.

Preferably the at least one ventilation device exhibits at least one handle distributor 26 for ventilation or back-ventilation of a handle. Handle distributor means a device for collecting, distributing and/or directing air within or along the handle, for example, through pipes or gaps which connect one or more attachment or ventilation openings with one another.

Preferably the at least one handle distributor exhibits at least one inlet line 26 for a distribution of air within or along the handle. Inlet line means a device through which air enters from the surroundings or the air feed device into the handle. Its shape produces a uniform distribution of air and heat in the handle, especially about the entire cross-sectional circumference of the handle, for example by means of screw or U-profile shaped or hollow-cylinder cavities. Their width permits a low-friction air flow within the air guidance device. Examples of this are dimensions which correspond to the feed device. The inlet line is directed, for example, parallel along the handle or the corresponding handle section, wound in helical fashion about a longitudinal axis of the handle as in FIG. 5B or surrounding it concentrically as in FIG. 5C. To save on materials, their walls at least in part are identical with those of the handle distributor, a spoke or a separator device between the inlet line and an outlet line. For an arrangement that is not visible, without impairing the stability of the steering mechanism, at least one inlet line is positioned at least in part within a handle, especially within a jacket and outside of a handle framework.

Preferably the at least one handle distributor exhibits at least one outlet line 28 for directing air out of the handle. Outlet line means a device through which air exits from the handle into the surroundings or to the air feed device. The shape, width, alignment, material and placement correspond to those of the inlet line. Placement at the same height relative to the inlet line effects a contradirectional guidance of two flows on the same plane. A staggered guidance of exhaust air at a level lower than the inlet air provides for homogeneous and efficient temperature control. Examples are contradirectional and helical inlet and outlet flows on the same cylindrical jacket (FIG. 5B) or a guidance of exhaust air in the outlet line in a layer lying below the inlet line (FIG. 5C).

Preferably the at least one handle distributor exhibits a separator device 29, 29'. Separator device means a device for spatial separation of the content of the inlet line and the outlet line. The number of the separator devices is chosen so that they cause more than one air flow through the handle to be generated. This allows faster temperature adjustment via simultaneous temperature regulation of multiple feed points, homogeneous air distribution and/or closed circulatory loops. It is favorable if at least one is provided with back-and-forth guidance of the planes differing from each other at the same height level relative to the longitudinal axis of the handle framework, or at least two helical-shaped separating devices. They are, for example, aligned equidistant in interval to and along a central handle axis or a spoke. It is preferred that they are helically wound or placed as (semi-)tubular shells around the handle framework. The shape and material results in easy assembly and ensures flow separation, for example by means of fins or bands made of rigid plastic injection molds, of metal sheets or cords made of elastic sealing material like rubber. It is appropriate if the separating device is part of an entry or exit guidance wall, a jacket layer and/or a handle recess.

In operation, the air conditioning device works in a suction, blowing or a combined operational mode.

In a blowing mode, the air transfer device 21 of the ventilation device 20 moves air to the handle 5 of the steering mechanism 2. While doing so it flows through a Peltier element 16*a*, where it is heated or cooled as desired. Then the air flows via multiple feed devices 24 into the handle distributor 26 of handle 5.

In the simplest case it flows as at location 80 through the inlet line 27, heats the jacket 7 of handle 5 and leaves the air conditioning device 15 and the handle through ventilation openings 61. In the suction mode the air would flow in precisely the opposite way. Then on the Peltier it would serve to remove either undesired heat or cold. But the Peltier element could also be switched off.

In a combined suction and blowing mode, there are various operational modes which also can occur simultaneously in an air conditioning device.

In the first combined mode, for example, at location 81, the blowing mode can be activated via a feed device 24 and additionally a flow of excess air in the suction mode can be brought back by suction via a separate return device 25 to the air transfer device 21.

In a second combined mode, as at location 82, air provided by the air transfer device can first heat jacket 7 in a tubular flow in the inlet line 27, and then be brought back in a concentric, interior tubular outlet line 28, at an interval from jacket 7 as waste air or to the air transfer device 21.

In a third combined mode, as at location 83, an air flow can be brought in helically through an inlet line 27 along a section of a handle 5 and helically around the handle 5. If this handle Is attachable only at one end, then via a second helical line, the outlet line 28, the air flow can be again directed back. These lines are produced within the handle distributor 26 in that two rubber strands are placed in helical fashion and displaced relative to each other along the handle 5 beneath the jacket 7.

In a fourth combined mode 5, at location 84, two air flows can also be guided in helical fashion and running counter to each other through the handle 5, if the corresponding section is attached at both ends to a feed device and simultaneously to a return device. This makes possible rapid and homogenous air conditioning.

With all of the operational modes described, if desired additionally a surface heating element 16*b* can be operated.

LIST OF REFERENCE SYMBOLS

1 Vehicle
2 Steering mechanism
3 Pivot pole
4 Spoke
5 Handle
6 Handle framework
7 Jacket
8 Carrier shell
8*a* Outer shell
8*b* Shell
8*c* Shell
9 Attendant layer
10 Partial shell
15 Air conditioning device
16 Heating device
16*a* Peltier element
16*b* Planar heating element
17 Temperature control device
18 Filament rheostat
19 Cooling device
20 Ventilation device
21 Air transfer device
22 Air guidance device
23 Spacer device
24 Feed device
25 Return device
26 Handle distributor
27 Inlet line
28 Outlet line
29, 29' Separator device
36 Monocoque shell
36 Handle section
40 gap
42 upholstery
43 cover
51 Section close to handle
61 ventilation opening

The invention claimed is:

1. A device for influencing at least one climatic parameter in a handle, the device comprising at least one ventilation device, the at least one ventilation device comprising:
   i. at least one air supply device moving air;
   ii. at least one air guidance device in fluid communication with the at least one air supply device, the at least one air guidance device guiding the air between the handle and the at least one air supply device; and
   iii. at least one handle distributor in fluid communication with the at least one air guidance device, the at least one handle distributor comprises:
      a. at least one inlet line through which the air enters the handle; and
      b. at least one outlet line through which the air exits the handle,
   wherein the at least one handle distributor collects, distributes and/or directs the air within or along the handle, the at least one handle distributor defines a channel having a gap extending between an outer periphery of a handle frame of the handle and an inner periphery of a jacket of the handle, the gap is supported by one or more spacer devices to keep open the gap, and
   wherein the at least one inlet line is helically wrapped around at least a portion of the handle frame, and the at least one outlet line is helically wrapped around at least a portion of the handle frame.

2. The device according to claim 1, characterized in that the device exhibits or is a heating, ventilation, or cooling device.

3. The device according to claim 2, characterized in that the device is provided for heating or cooling a steering mechanism.

4. The device according to claim 1, characterized in that the device is provided for heating or cooling a steering mechanism.

5. A vehicle equipped with at least one device according to claim 4.

6. A vehicle or a steering mechanism equipped with at least one device according to claim 1.

7. The steering mechanism of claim 6, wherein the steering mechanism includes:
   i. a pivot pole that is an axis of the steering mechanism; and
   ii. at least one spoke that connects the pivot pole to the handle;
     wherein the device is located in a central portion of the steering mechanism.

8. The steering mechanism of claim 7, wherein the handle includes a plurality of vent openings around the handle.

9. The steering mechanism of claim 8, wherein the handle includes at least one solid handle section that is free of vent openings.

10. The device according to claim 1, wherein the device includes a cooling device that is a peltier device.

11. The device according to claim 1, wherein the at least one outlet line comprises five outlet lines.

12. The device according to claim 1, wherein the at least one outlet line is concentrically located within the at least one inlet line.

13. The device according to claim 1, wherein the at least one inlet line and the at least one outlet line run counter to each other.

14. A device for heating, cooling, or ventilating a steering mechanism comprising a handle, the device comprising:
   at least one ventilation device comprising:
     i. at least one air supply device moving air; and
     ii. at least one air guidance device in fluid communication with the at least one air supply device, the at least one air guidance device guiding the air between the handle and the at least one air supply device, the at least one air guidance device is in communication with at least one handle distributor located within the handle,
     wherein the at least one handle distributor comprises;
       a. at least one inlet line through which the air enters the at least one handle distributor; and
       b. at least one outlet line through which the air exits the at least one handle distributor,
   wherein the at least one handle distributor collects, distributes and/or directs the air within or along the handle,
   wherein the at least one inlet line and the at least one outlet line are spatially separated by a separator device that is generally aligned along a central axis of the handle, or is helically wrapped around the handle, and
   wherein either:
     1. in a first Section of the handle, the at least one inlet line is helically wrapped around a handle frame and the at least one outlet line is helically wrapped around the handle frame, and in a second section of the handle, the at least one inlet line and the at least one outlet line run counter to each other, or
     2. the at least one inlet line is helically wrapped around at least a portion of a handle frame, and the at least one outlet line is also helically wrapped around at least a portion of the handle frame.

15. A vehicle equipped with at least one device according to claim 14.

16. The device according to claim 14, wherein the device includes at least one filament rheostat for direct or indirect heating of the handle.

\* \* \* \* \*